(12) United States Patent
Ochsenfeld et al.

(10) Patent No.: US 12,379,719 B2
(45) Date of Patent: Aug. 5, 2025

(54) METHOD AND DEVICE FOR MONITORING A MILLING PROCESS

(71) Applicant: SEIMENS AKTIENGESELLSCHAFT, Munich (DE)

(72) Inventors: Henning Ochsenfeld, Nuremberg (DE); Thorsten Reimann, Erlangen (DE); Liam Pettigrew, Petersham (AU)

(73) Assignee: Siemens Aktiengesellschaft, Munich (DE)

( * ) Notice: Subject to any disclaimer, the term of this patent is extended or adjusted under 35 U.S.C. 154(b) by 981 days.

(21) Appl. No.: 17/599,544

(22) PCT Filed: Mar. 24, 2020

(86) PCT No.: PCT/EP2020/058069
§ 371 (c)(1),
(2) Date: Sep. 28, 2021

(87) PCT Pub. No.: WO2020/200903
PCT Pub. Date: Oct. 8, 2020

(65) Prior Publication Data
US 2022/0197273 A1    Jun. 23, 2022

(30) Foreign Application Priority Data
Mar. 29, 2019   (EP) .................................... 19166079

(51) Int. Cl.
*G05B 23/02*   (2006.01)
*G05B 19/042*  (2006.01)
(Continued)

(52) U.S. Cl.
CPC ..... *G05B 23/0283* (2013.01); *G05B 19/0428* (2013.01); *G05B 19/4065* (2013.01);
(Continued)

(58) Field of Classification Search
CPC ............ G05B 23/0283; G05B 19/0428; G05B 19/4065; G05B 2219/34477;
(Continued)

(56) References Cited

U.S. PATENT DOCUMENTS 5,386,945 A    2/1995   Nose
6,165,051 A    12/2000  Weisshaus
(Continued)

FOREIGN PATENT DOCUMENTS

CN    202264145 U    6/2012
CN    103324139 A    9/2013
(Continued)

OTHER PUBLICATIONS

Lee et al. "Application of the Discrete Wavelet Transform to the Monitoring of Tool Failure in End Milling Using the Spindle Motor Current" (Year: 1999).*
(Continued)

*Primary Examiner* — Rehana Perveen
*Assistant Examiner* — Troy A Maust
(74) *Attorney, Agent, or Firm* — Lempia Summerfield Katz LLC

(57) ABSTRACT

The invention relates to a method for monitoring a milling process of a printed circuit board, having the steps of: (a) detecting (S1) the rotational speed of a milling head (2) of a milling machine (1) and at least one other operating parameter of the milling machine (1) during the milling process, wherein the other operating parameter is an electric supply current for operating the milling machine, and (b) analyzing (S2) the detected rotational speed and the detected operating parameter using a trained adaptive algorithm for detecting anomalies during the milling process.

18 Claims, 1 Drawing Sheet

(51) Int. Cl.
  *G05B 19/4065* (2006.01)
  *G06N 3/08* (2023.01)
  *G06N 3/044* (2023.01)
(52) U.S. Cl.
  CPC ..... *G06N 3/08* (2013.01); *G05B 2219/34477* (2013.01); *G05B 2219/45145* (2013.01); *G05B 2219/50185* (2013.01); *G06N 3/044* (2023.01)
(58) Field of Classification Search
  CPC .......... G05B 2219/45145; G05B 2219/50185; G06N 3/08; G06N 3/044; G06N 3/0895; G06N 3/09; G06N 3/091; G06N 3/092; G06N 3/094; G06N 3/096; G06N 3/098; G06N 3/0985; G06N 3/0442; Y02P 90/02
  See application file for complete search history.

(56) References Cited

U.S. PATENT DOCUMENTS

| | | |
|---|---|---|
| 6,535,005 B1 | 3/2003 | Field |
| 8,781,982 B1 | 7/2014 | Das et al. |
| 2004/0179915 A1 | 9/2004 | Hill et al. |
| 2007/0088550 A1 | 4/2007 | Filev et al. |
| 2016/0091393 A1 | 3/2016 | Liao et al. |
| 2016/0346856 A1 | 12/2016 | Luo |
| 2019/0270151 A1 | 9/2019 | Iwabuchi |
| 2021/0079600 A1 | 3/2021 | Berning et al. |

FOREIGN PATENT DOCUMENTS

| | | | | |
|---|---|---|---|---|
| CN | 104965490 A | | 10/2015 | |
| CN | 106180928 A | | 12/2016 | |
| CN | 106873525 A | | 6/2017 | |
| CN | 107085625 A | | 8/2017 | |
| CN | 108536938 A | | 9/2018 | |
| JP | 6385598 B1 | | 9/2018 | |
| KR | 20020016178 A | * | 3/2002 | ............. B23Q 15/12 |
| KR | 101170323 B1 | * | 8/2012 | ............. B23Q 11/04 |
| TW | 478023 B | | 3/2002 | |

OTHER PUBLICATIONS

Li et al. "Tool Breakage Detection using Deep Learning" 2018 IEEE/ACIS 3rd International Conference on Big Data, Cloud Computing, Data Science & Engineering (Year: 2018).*

Yang Yang et al:"By Orthogonal Test Optimization Process Electrical-discharge Milling Parameters" Oct. 20, 2018. with English abstract. pp. 1-4.

European Search Report for European Application No. 19166079. 4-1204 dated Sep. 20, 2019.

Notification of the Submission of the International Provisional Patentability Report for International Patent Application No. PCT/EP2020/058069 mailed Jul. 26, 2021.

PCT International Search Report and Written Opinion of International Searching Authority mailed Jul. 15, 2020, corresponding to PCT International Application No. PCT/EP2020/058069.

* cited by examiner

METHOD AND DEVICE FOR MONITORING A MILLING PROCESS

This application is the National Stage of International Application No. PCT/EP2020/058069, filed Mar. 24, 2020, which claims the benefit of European Patent Application No. EP 19166079.4, filed Mar. 29, 2019. The entire contents of these documents are hereby incorporated herein by reference.

BACKGROUND

The present embodiments relate to a method and an apparatus for monitoring a milling process.

The patent application US 2016/091393 A1 describes a method or system for predicting and planning in production plants. In this case, in order to detect wear on a tool, the power of the spindle is monitored. In order to compensate for wear on the tool, the power of the spindle and as a result a rotational speed of the spindle are increased. In this case, the long term trend of the power of the spindle is extrapolated in order to predict a remaining useful life.

The patent application US 2007/088550 A1 describes a method for preventative maintenance of a machine. For this purpose, data is gathered relating to the operation of the machine, such as, for example, vibration, speed, or current. This data is used to generate features in order to predict faults.

The patent application US 2004/179915 A1 describes a tool machine. In this case, in order to analyze the behavior of the tool machine, signals that are described as signature variables and are used as input variables for an artificial neural network are recorded.

The patent U.S. Pat. No. 8,781,982 B1 describes a method and an apparatus for determining the remaining useful life. For this purpose, operational data is fed into an artificial neural network. The operational data may be vibration data, acoustic data, and acceleration data.

Milling is generally a metal cutting manufacturing process for producing workpieces that have a specific geometric shape. During milling, material is removed in that the milling tool or milling head rotates at a high speed about its own axis, while either the milling tool itself moves along the contour that is to be produced on the workpiece, or the workpiece is moved accordingly relative to the milling head. Milling machines may be used for milling different workpieces (e.g., also for milling printed circuit boards). For example, it is possible to provide separating lines between conductor track areas of a printed circuit board by milling. A large quantity of dust may occur during the milling process, with the result that the milling spindle may remain stuck after a particular operating time. In the case of conventional milling machines, such faults or failures are only detected after the respective fault has occurred (e.g., after the milling spindle has become jammed). A failure of a milling machine during a milling process may lead to a considerable delay in the manufacturing process of the object that is to be produced. Further, the workpiece that has not been completed in this production step becomes in many cases a reject item and cannot be further processed. A milling machine coming to a standstill during a running production process requires the immediate intervention of maintenance personal or service technicians so as to perform the maintenance work or repair measures. In many cases, such service technicians are not immediately available and are to be requested. This may lead to an entire production line within a factory coming to a temporary standstill.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and an apparatus for monitoring a milling process, which predict, at an early stage, possible failures on account of an affected milling machine in order for counter measures to be able to be performed in good time are provided.

The present embodiments include a method for monitoring a milling process. The method includes detecting a rotational speed of a milling head of a milling machine and detecting at least one further operating parameter of the milling machine during the milling process and evaluating the detected rotational speed and the detected operating parameter by a trained adaptive (e.g., learning-capable) algorithm for identifying anomalies during the milling process.

It is possible with the aid of the method in accordance with the present embodiments to considerably increase the productivity of the milling machine. Undesired downtimes of the milling machine are prevented. It is thus possible to avoid the failure of a milling machine during a milling process. Further, the quality of intermediate products or of the products that are produced in the milling process may be increased. In order to identify hazardous states, the functionality of tool machines (e.g., milling machines) is to be monitored (e.g., technically tested). Further, monitoring may be used to evaluate the remaining useful life of the milling machine. By monitoring the tool machine, it is thus possible to avoid an unplanned standstill and to achieve a longer operational life of the milling machine.

In the case of one possible embodiment of the method, the further operating parameters have an electrical supply current for operating the milling machine.

This operating parameter offers the advantage that the operating parameter may be detected in a relatively simple manner with little technical outlay.

In the case of a further possible embodiment of the method, after anomalies have been identified, a notification is generated for the operator of the milling machine and displayed on a display unit of the milling machine in real time.

In the case of a further possible embodiment of the method, maintenance measures are automatically initiated after anomalies have been identified.

Operational downtimes are hereby further minimized.

In the case of a further possible embodiment of the method, after anomalies have been identified during the milling process, a probability of failure and/or an anticipated outage period of the milling machine is calculated.

The production planning of the production process may be hereby optimized.

In the case of a further possible embodiment of the method, after anomalies have been identified during the milling process, at least one possible cause for the occurrence of the anomalies is determined.

This renders it possible to perform maintenance work or repair measures in a purposeful manner with the result that outages or downtimes of the milling machine are reduced.

In the case of a further possible embodiment of the method, the trained adaptive algorithm has a trained neural network.

In the case of a further possible embodiment of the method, the adaptive algorithm is trained in a training phase prior to the commencement of the production milling process based on historical training data with respect to the rotational speed and the at least one further operating parameter of the milling machine.

In the case of a further possible embodiment of the method, the adaptive algorithm is downloaded as an application from a database via a network into a computing unit of the milling machine and trained in a training phase for the production milling process.

In the case of a further possible embodiment of the method, the adaptive algorithm is selected in dependence upon a type of milling machine and/or a type of a workpiece that is to be milled in the milling process.

In the case of a further possible embodiment of the method, the workpiece that is to be milled is a printed circuit board.

In the case of a further possible embodiment of the method, the rotational speed of the milling head of the milling machine and the at least one further operating parameter are detected, and corresponding data is supplied at a data rate of approximately 1/sec to a trained adaptive algorithm that is implemented in the computing unit of the milling machine.

In the case of a further possible embodiment of the method, the anomalies are determined by the trained adaptive algorithm in real time during the production milling process.

The present embodiments provide, in accordance with a further aspect, a milling machine for milling a workpiece.

The present embodiments accordingly provide a milling machine for milling a workpiece having a rotatable milling head for processing the workpiece in a milling process, an electric motor for driving the milling head, and an artificial intelligence module that, during the milling process, identifies anomalies of the milling process based on a detected rotational speed of the milling head and at least one further operating parameter of the milling machine (e.g., a supply current to the electric motor).

In the case of a further possible embodiment of the milling machine, the artificial intelligence module implements a trained adaptive algorithm during the milling process.

In the case of a further possible embodiment of the milling machine, the artificial intelligence module of the milling machine is configured so as in the event that anomalies are identified during the milling process to calculate a probability of failure and/or an anticipated outage period of the milling machine.

In the case of a further possible embodiment of the milling machine, the artificial intelligence module of the milling machine moreover is configured so as to determine at least one possible cause for the anomalies occurring during the milling process.

DETAILED DESCRIPTION

Figure 1:
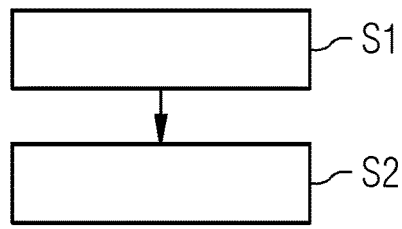
FIG. 1 shows a flow diagram for illustrating a possible embodiment of a method for monitoring a milling process.

As illustrated by the flow diagram in accordance with FIG. 1, a method in accordance with the present embodiments for monitoring a milling process has in the case of the illustrated embodiment two main acts.

In a first act S1, a rotational speed or turning speed of a milling head 2 of a milling machine 1 is detected. Further, in the act S1, at least one further operating parameter of the milling machine 1 is detected during the milling process. This further operating parameter has, for example, an electrical supply current for operating the milling machine 1. This electrical supply current serves, for example, to supply an electric motor 3 that drives the milling head 2 of the milling machine 1.

In a further act S2, the detected rotational speed R and the detected operating parameter (e.g., the electrical supply current I) are evaluated by a trained adaptive algorithm for identifying anomalies A during the milling process.

In a further possible act (not illustrated in FIG. 1), after anomalies have been identified, a notification is generated for the operator of the milling machine 1. For example, anomalies that are identified may be displayed on a display unit of the milling machine 1 in real time. Further, in a further act, automatic maintenance measures for eliminating possible causes of the identified anomalies A are automatically initiated. After anomalies have been identified during the milling process in act S2, a calculation is performed in one possible embodiment to determine a probability of failure or an anticipated outage period of the affected milling machine 1. Possible maintenance measures may be adapted to suit the calculated probability of failure and/or the anticipated outage period. For example, in the case of a high probability of failure, milling machines 1 are serviced or repaired with a high degree of urgency or priority. Further, it is possible, based on the calculated anticipated outage periods, to control which maintenance measures are to be performed on which milling machines 1 in which time period. In the case of a further possible embodiment of the method in accordance with the present embodiments, after anomalies have been identified during the milling process, at least one possible cause for the occurrence of the anomalies A is determined (e.g., wear or a jamming of the drive spindle). In the case of one possible embodiment, the trained, adaptive algorithm that is used to identify anomalies has a trained neural network NN. An adaptive algorithm (e.g., the neural network NN) may be trained in a training phase prior to the commencement of the production milling process based on historical training data with respect to the rotational speed R and the at least one further operating parameter P of the milling machine 1. The trained neural network NN has, in the case of one possible embodiment, a recurrent neural network (RNN).

The adaptive algorithm that is used to identify the anomalies may be downloaded in one possible embodiment as an application (App) from a database via a network in to a computing unit of the milling machine 1, and may be trained in a training phase for the subsequent production milling process. The utilized adaptive algorithm may be selected in the case of one possible embodiment variant in dependence upon a type of the affected milling machine 1 and/or a type of a workpiece W that is to be milled in the milling process.

In the case of one possible embodiment, the workpiece W that is to be milled by the milling machine 1 has a printed circuit board.

The rotational speed R and the further operating parameters (e.g., the supply current I) are detected in the act S1 in the case of one possible embodiment based on corresponding data that is supplied at a data rate of approximately 1/sec. to a trained adaptive algorithm that is implemented in the computing unit of the milling machine 1. The anomalies are determined or identified in the act S2 by the trained adaptive algorithm (e.g., by a trained neural network NN) during the production milling process (e.g., in real time, during the production procedure).

For example, one or multiple current spikes (e.g., short-term current spikes) of the supply current (e.g., of approximately 5 to 10 seconds) are identified as an anomaly. In this case, a sudden increase in the supply current is characterized by a subsequent, slowly falling edge. Such an anomaly is, for example, due to mill chippings that pass into the milling spindle. The mill chippings cause an increased friction in the milling spindle. By a subsequent control of the supply voltage, in order to maintain a constant rotational speed or rotating speed of the milling head, the supply current increases (e.g., sudden increase). If the mill chippings are comminuted by the rotational movement of the milling spindle, then the supply current returns to its normal state (e.g., falling edge). This may occur in order to maintain constant the rotational speed of the milling head or of the milling spindle. In addition, so as to identify an anomaly, it is possible to suitably select the sampling rate of the supply current, with the result that a current spike or anomaly is not missed by insufficient sampling of the supply current. Further, it is possible to simultaneously select the sampling rate of the supply current sufficiently low, with the result that excessively large quantities of data do not occur.

A quality indicator may be formed that indicates whether the detected measurement points of the supply current no longer lie in the normal range of the milling machine. For example, the higher this value, the greater the probability that the measurement points lie outside the normal range. The quality indicator may be formed in this case as a function of the rotational speed and the supply current. With the aid of the number of anomalies that have occurred, it is then possible to determine or predict a remaining useful life or failure of the milling machine.

In accordance with one embodiment, a milling process, in which mill chippings occur, for example, as a result of milling a printed circuit board, is thus monitored, for example, in order to determine or predict a failure or a remaining useful life of the milling machine.

In a further embodiment, the supply current is monitored with regard to whether a short-term or transient deviation from a basis value of the supply current occurs, and the supply current returns to this basis value. A trained adaptive algorithm may be used to monitor the supply current. In addition or alternatively, it is possible to provide a threshold value by which such a current spike of the supply current is identified. After such a current spike of the supply current has been identified, it is possible to monitor whether the supply current drops back to below the threshold value (e.g., to the basis value of the supply current). The basis value may be the value of the supply current from which the current spike is formed. The basis value of the supply current may be predetermined by the desired rotational speed of the milling machine (e.g., of the spindle of the milling machine), or the rotational speed of the milling machine is predetermined by the basis value of the supply current. In addition, the frequency of such current spikes may be detected, and in dependence thereon, a failure of the milling machine or a remaining useful life may be determined. This may be performed, for example, by a quality indicator.

In order to provide that the current spikes are identified, the supply current is to be sufficiently sampled. For example, the supply current may be sampled such that the current spikes as a result of mill chippings that have passed into the milling spindle may be detected. For example, the supply current may be sampled approximately once per second or more frequently than once per second.

In a further embodiment, monitoring is performed as to whether in the case of a constant (e.g., essentially constant) or unvarying rotational speed a change (e.g., in the form of a current spike) occurs in the supply current. This change in the supply current is due in this case, for example, to the comminuting of mill chippings. It is thus possible to monitor the supply current for current spikes that occur as a result of comminuting mill chippings (e.g., in the case of a constant rotational speed of the milling head or of the milling spindle). These current spikes may have a typical progression. This typical progression, described above, of a current spike may be monitored and/or detected, for example, by a trained adaptive algorithm. For this purpose, the adaptive algorithm may be trained based on historical data. A current spike may then be identified by the trained adaptive algorithm as an anomaly. For example, the trained adaptive algorithm described above may distinguish current spikes that are caused by the communiting of mill chippings from current spikes of other origins.

Further, the workpiece that is being processed may be a workpiece that is embodied from a homogenous material or a section of the workpiece that is being processed by the milling machine, the section being embodied from a homogenous material. As a consequence, it is achieved that it is possible to assume an unvarying rotational speed of the milling head. In the case of inhomogeneities in the workpiece, changes would otherwise occur in the rotational speed, or the rotational speed would have to be adapted in dependence upon the section of the workpiece that is just being processed. It is consequently possible to provide that multiple sections are processed, each with a different predetermined desired rotational speed. In this case, the respective desired rotational speed serves as a basis value for detecting current spikes.

In lieu of the supply current or together with the supply current, it is also possible to detect and evaluate the supply voltage. As an alternative, it is also possible to use other variables that are derived from the supply current and/or supply voltage so as to monitor the milling process or to predict a remaining useful life or probability of failure of the milling machine.

Printed circuit boards include electrically insulating material having conducting connections (e.g., conductor tracks) that are adhered thereto. Fiber-reinforced plastic is suitable as an insulating material in the case of more favorable devices: laminated paper. The conductor tracks include mostly a thin layer of copper. Printed circuit boards may also be structured by milling the copper layers (e.g., "insulation milling", see below image of solder grid printed circuit boards). Such printed circuit boards do not include conductor tracks but rather include areas that are separated from one another by milled tracks.

In the case of milling technology, the separating lines between the conductive areas are produced by a milling machine or a pin milling tool. In this case, all the copper remains (e.g., island method). The wet chemical and photolithographic steps are omitted. CNC programs may be generated by special CAD software with the result that printed circuit boards may be manufactured quickly.

Figure 2:
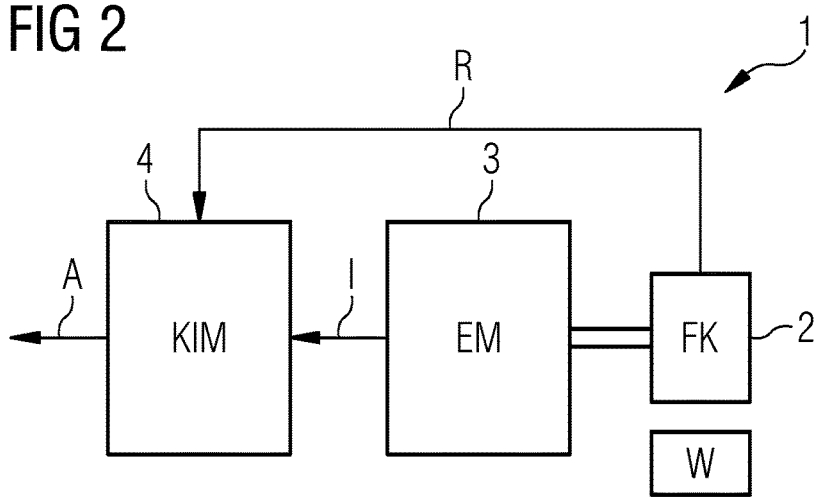
FIG. 2 shows a block diagram for illustrating an exemplary embodiment of a milling machine.

FIG. 2 illustrates a block diagram for illustrating an embodiment of a milling machine 1. The milling machine 1 illustrated in FIG. 2 is operable to mill a workpiece W. The workpiece W is, for example, a printed circuit board. The milling machine 1 has at least one rotatable milling head 2 for processing the workpiece W in a milling process. The milling head 2 is driven by an electric motor 3 of the milling machine 1. In so doing, the electric motor 3 draws an electrical supply current. The supply current may include one or multiple current phases (L1, L2, L3). The milling machine 1 has, for example, an artificial intelligence module 4, as is illustrated in FIG. 2. On the basis of a detected rotational speed R of the milling head 2 and at least of a further operating parameter P of the milling machine 1, the artificial intelligence module 4 identifies, during the milling process, anomalies that occur during the milling process. The artificial intelligence module 4 may evaluate multiple operating parameters P for identifying anomalies A. In the case of one possible embodiment, the artificial intelligence module 4 implements a trained adaptive algorithm during the milling process.

In the case of one possible embodiment, the artificial intelligence module 4 implements a trained neural network NN having multiple layers. The trained neural network NN has an input layer, one or multiple intermediate layers (e.g., hidden layers), and an output layer. Neural nodes with corresponding activation functions are located in each layer. The neural nodes of the different layers are linked to one another, the links being weighted.

The weighting factors w are set in the training phase. The artificial intelligence module 4 or neural network may be further trained in the ongoing milling process. In the case of one possible embodiment, the artificial intelligence module 4 is trained in a non-monitored (e.g., unsupervised) learning process. The learning process may be performed based on historical training data. This historical training data includes, for example, historical current supply data and historical rotational speed data of the milling head 2. This historical training data is located in a data storage device. In the case of one possible embodiment, the training data is downloaded from a database of the operator of the milling machine and used for training purposes.

The utilized adaptive algorithm (e.g., the utilized neural network NN) may be selected in the case of one possible embodiment variant in dependence upon a type of the milling machine 1 and/or a type of a workpiece W that is to be milled in the milling process. The adaptive algorithm may be downloaded in the case of one possible embodiment likewise from a database in the artificial intelligence module 4 of the milling machine 1. For example, training data and suitable adaptive algorithms may be downloaded via a data network from a Cloud platform 6 of a milling machine manufacturer or a milling machine operator. For example, an adaptive algorithm that is suitable for monitoring a milling process on printed circuit boards is downloaded. In the case of one possible embodiment, a vector that includes different operating parameters P of the milling machine 1 lies on the input layer of the neural network. This state vector z has, for example, two operating parameters P (e.g., the rotational speed R of the milling head 2 and the electrical current I drawn from the electric motor 3). The state vector z, which is applied to the input layer of the neural network NN, may include further operating parameters P depending on the application. For example, each phase L of a multi-phase supply current may represent an operating parameter P. The artificial intelligence module 4 may output a calculated probability of failure of the milling machine 1 (e.g., for an anticipated outage period) as output values. In addition, identified anomalies A may be output to a user of the milling machine 1 in real time by way of a user interface. The milling process itself may be controlled in the case of one possible embodiment by a CNC program that is implemented by a controller or microprocessor of the milling machine 1. During the milling process, a forward thrust movement of the milling head 2 is performed in a perpendicular or oblique manner with respect to the axis of rotation of the milling head 2. If the workpiece W is a printed circuit board, the milling machine 1 controlled by a software or a CNC program generates tracks that run along a desired conductor track. For example, the conductor track that is to be produced is isolated from a remaining conductive material (e.g., copper). This is also described as isolation milling. It is possible to use for milling isolation channels a small conical milling head that removes conductive material (e.g., copper) along the calculated movement tracks. The material removed may lead to a blocking or impairing of the movability of the milling head 2, where such abnormalities or anomalies are identified or detected at an early stage with the aid of the method in accordance with the present embodiments. In the case of one possible embodiment, it is also possible to calculate for different anomalies A corresponding evaluation numbers that indicate the extent of the identified anomaly or the resulting probability of failure. Such anomaly indicators may be output in the case of one possible embodiment in real time by way of a display unit to the operator of the milling machine 1. By the method in accordance with the present embodiments, possible anomalies may be identified during the ongoing milling process around the clock and possible causes of faults determined. This renders it possible to initiate or perform repair work or maintenance measures in good time on the affected milling machine 1 with the result that downtimes within the milling process are to a greatest extent avoided. The method in accordance with the present embodiments may be used for a number of milling machines that are used simultaneously in a production line.

In the case of the embodiment illustrated in FIG. 2, the artificial intelligence module 4 is implemented locally in a computing unit of the milling machine 1. In the case of an alternative embodiment, the artificial intelligence module 4 may also be implemented on a remote server of a cloud platform 6 that communicates via a data connection in a bi-directional manner with a controller of the milling machine 1. The technical data connection includes, in the case of one possible embodiment, a local network or intranet. Alternatively, the data connection may also be a global network or the Internet. The method in accordance with the present embodiments for monitoring the milling process is a computer-implemented method that is stored in the case of one possible embodiment on a computer-readable medium. The computer-readable medium includes, for example, a data storage device of the milling machine 1. Further, the computer-readable medium may also have a portable data carrier (e.g., a CD-ROM or a USB stick). Depending upon the individual application, it is possible in the case of one possible embodiment to use different adaptive algorithms for identifying anomalies during the milling process. For example, it is possible to provide a support vector machine for calculating a quality indicator. In the case of one possible embodiment, further sensors are provided in the environment of the milling head 2. The further sensors supply additional data to the artificial intelligence module 4. For example, image sensors may supply image data to the artificial intelligence module 4 as input operating parameters P of the state vector z. This renders it possible to further increase the reliability or accuracy of the method in accordance with the present embodiments.

Figure 3:
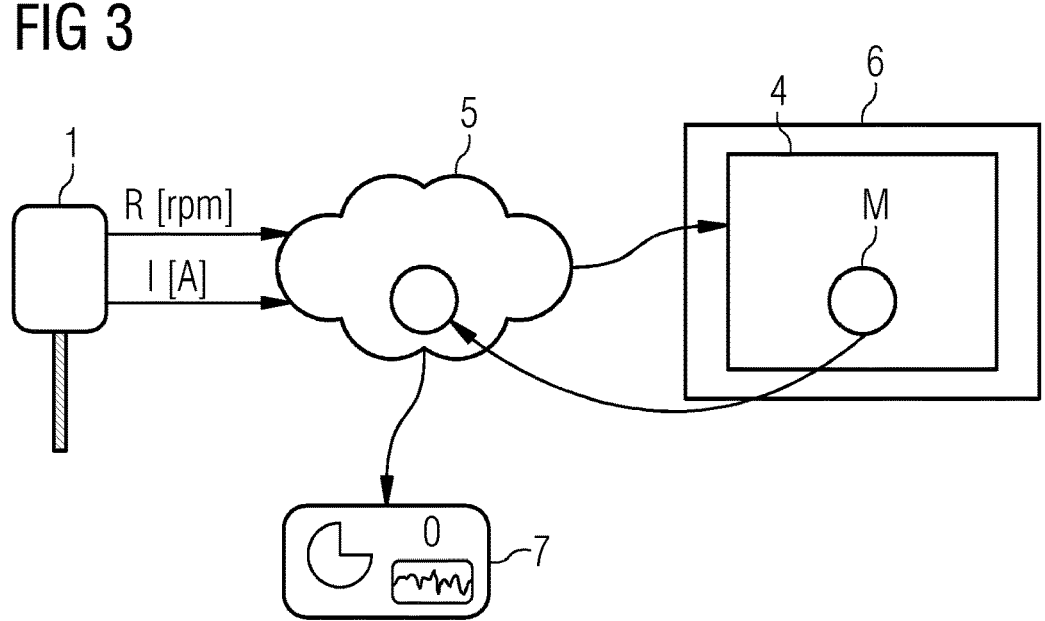
FIG. 3 shows a block diagram for illustrating a further possible exemplary embodiment of the milling machine.

FIG. 3 illustrates schematically a further exemplary embodiment of the apparatus for monitoring a milling process. In the case of the illustrated exemplary embodiment, the milling machine 1 supplies, via an interface, detected operating parameters via a data network or a cloud 5 to a cloud platform 6 in which an artificial intelligence module 4 is integrated. It is possible, via a display apparatus 7, to output in real time anomalies or notifications to the operator of the milling machine 1. In the case of one possible embodiment, the display unit 7 is likewise connected to the data network or the cloud 5. In one embodiment, the display apparatus 7 is a portable device (e.g., a smartphone) of the user. By the method in accordance with the present embodiments, deviations in the feature space of the operating parameters are detected at an early stage. With the aid of a data model M, it is possible in addition to automatically determine causes for the occurrence of anomalies or failures of the milling machine 1. This data model M may describe the structural construction of the milling machine 1 (e.g., as ontology). In the case of the exemplary embodiment illustrated in FIG. 3, two features or operating parameters P (e.g., the electrical supply current I and the rotational speed R) are used in order to train the adaptive algorithm or the neural network. In the case of one possible embodiment, the trained adaptive algorithm requires a relatively small storage space of less than 10 MB. This renders it possible to implement the adaptive algorithm from a cloud platform 6 on an automation device. The method in accordance with the present embodiments may be scaled in a simple manner for a plurality of milling machines 1. In the case of one possible embodiment, the artificial intelligence module 4 supplies evaluation numbers of the identified anomalies or possible probabilities of failure. In the case of one possible embodiment of the method in accordance with the present embodiments, the operating parameters P are evaluated with the aid of a trained adaptive algorithm on a server of the cloud platform 6 based on operating data that is transmitted via the network 5 from one or multiple milling machines to the server of the cloud platform 6. The adaptive algorithm may be downloaded in the case of one possible embodiment as an application from a database and may be implemented by the artificial intelligence module 4 after training. The artificial intelligence module 4 may in the case of one possible embodiment be provided locally in the milling machine 1, as illustrated in FIG. 2, or remotely on a server of a cloud platform 6, as illustrated in FIG. 3.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for monitoring a milling process of a printed circuit board, the method comprising the steps of:
    detecting a rotational speed of a milling head of a milling machine and at least one further operating parameter of the milling machine during the milling process, wherein the further operating parameter is an electrical supply current for operating the milling machine;
    detecting, in the case of a constant rotational speed, a current spike of the electrical supply current that is due to mill chippings, wherein the electrical supply current is sampled, such that current spikes as a result of mill chippings are detected;
    evaluating the detected rotational speed and the detected at least one further operating parameter by a trained adaptive algorithm for identifying anomalies during the milling process; and
    detecting a current spike of the electrical supply current that is due to comminuting of mill chippings, the current spike of the electrical supply current that is due to comminuting of mill chippings having a characterizing progression that is identified by the trained adaptive algorithm.

2. The method of claim 1, wherein detecting, in the case of the constant rotational speed, the current spike of the electrical supply current that is due to mill chippings comprises detecting, in the case of the constant rotational speed, the current spike of the electrical supply current that is due to mill chippings by comminuting mill chippings by the milling spindle.

3. The method of claim 1, further comprising:
    after anomalies have been identified:
        generating a notification is generated for an operator of the milling machine and displaying the notification on a display unit of the milling machine in real time;
        automatically initiating maintenance measures; or
        a combination thereof.

4. The method of claim 1, further comprising calculating a probability of failure, an anticipated outage period, or the probability of failure and the anticipated outage period of the milling machine after anomalies have been identified during the milling process.

5. The method of claim 1, further comprising determining at least one possible cause for the occurrence of the anomalies after the anomalies have been identified during the milling process.

6. The method of claim 1, wherein the trained adaptive algorithm has a trained neural network.

7. The method of claim 1, wherein the adaptive algorithm is trained in a training phase prior to commencement of a production milling process based on historical training data with respect to the rotational speed and the at least one further operating parameter of the milling machine.

8. The method of claim 1, wherein the adaptive algorithm is downloaded as an application from a database by way of a network into a computing unit of the milling machine and trained in a training phase for a production milling process.

9. The method of claim 1, wherein a quality indicator is formed using the rotational speed and further operating parameters, and the quality indicator is used for determining one or multiple anomalies.

10. The method of claim 1, wherein the rotational speed of the milling head of the milling machine and the at least one further operating parameter are detected and corresponding data is supplied at a data rate of 1/sec to the trained adaptive algorithm, which is implemented in a computing unit of the milling machine.

11. The method of claim 1, wherein the anomalies are determined by the trained adaptive algorithm in real time during a production milling process.

12. A milling machine for milling a workpiece, wherein the workpiece is a printed circuit board, the milling machine comprising:
   a rotatable milling head operable to process the workpiece in a milling process, process;
   an electric motor operable to drive the milling head; and
      an artificial intelligence module configured to identify, during the milling process, anomalies of the milling process based on a detected rotational speed of the milling head and at least one further operating parameter of the milling machine,
      wherein the further operating parameter is a supply current to the electric motor,
      wherein the intelligence module is further configured to detect, in the case of a constant rotational speed, a current spike of the supply current that is due to mill chippings,
      wherein the supply current is sampled such that the current spikes as a result of mill chippings, which have passed into the milling spindle, are detected, and
      wherein the intelligence module is further configured to detect and identify, using a trained adaptive algorithm, a current spike of the supply current that is due to the comminuting of mill chippings and has a characteristic curve.

13. The milling machine of claim 12, wherein the artificial intelligence module is configured to implement a trained adaptive algorithm during the milling process.

14. The milling machine of claim 12, wherein the artificial intelligence module of the milling machine is further configured to:
   calculate a probability of failure, an anticipated outage period, or the probability of failure and the anticipated outage period of the milling machine 1 when anomalies are identified during the milling process;
   determine at least one possible cause for the occurrence of the anomalies during the milling process; or
   a combination thereof.

15. The milling machine of claim 12, wherein the intelligence module is further configured to detect, in the case of a constant rotational speed, the current spike of the supply current that is due to comminuting of mill chippings by the milling spindle.

16. The milling machine of claim 12, wherein the intelligence module is further configured to form a quality indicator using the rotational speed and further operating parameters, and the quality indicator is usable to determine one or multiple anomalies.

17. The method of claim 9, wherein the quality indicator is formed by the trained adaptive algorithm, and the quality indicator is used for determining the one or multiple anomalies using the trained adaptive algorithm.

18. The milling machine of claim 16, wherein the quality indicator is usable to determine the one or multiple anomalies using the trained adaptive algorithm.

* * * * *